United States Patent
Pankau et al.

(10) Patent No.: US 7,480,124 B2
(45) Date of Patent: Jan. 20, 2009

(54) DETECTION OF AN AC INPUT PHASE-LOSS ON A MULTI-PHASE AC SERVO DRIVE

(75) Inventors: Jeffery J. Pankau, Jackson, WI (US); Robert Harris Schmidt, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/669,786

(22) Filed: Jan. 31, 2007

(65) Prior Publication Data

US 2008/0180087 A1  Jul. 31, 2008

(51) Int. Cl.
*H02H 3/00* (2006.01)
*H02H 3/20* (2006.01)
*H02H 3/25* (2006.01)
*H02H 9/04* (2006.01)
*H02H 3/22* (2006.01)

(52) U.S. Cl. ............................. 361/85; 361/86; 361/87; 361/90; 361/91.1; 361/111

(58) Field of Classification Search ............. 361/85–87, 361/90, 91.1, 111
See application file for complete search history.

(56) References Cited

U.S. PATENT DOCUMENTS

2006/0187683 A1 * 8/2006 Hsieh et al. .................... 363/10
2007/0005194 A1 * 1/2007 Chang et al. ................ 700/292

* cited by examiner

*Primary Examiner*—Michael J Sherry
*Assistant Examiner*—Dharti H Patel
(74) *Attorney, Agent, or Firm*—Amin & Turocy LLP; Alexander R. Kuszewski (57) ABSTRACT

Systems and methods that detect a phase loss condition in a three-phase electrical power source are presented. The system includes a detection component that measures and/or monitors a magnitude and frequency of a voltage of a power source, and a controller component that compares measured and/or monitored voltage characteristics to characteristics associated with phase loss.

17 Claims, 10 Drawing Sheets

DETECTION OF AN AC INPUT PHASE-LOSS ON A MULTI-PHASE AC SERVO DRIVE

BACKGROUND

Three-phase electric power is a common method of electric power transmission and is implemented by three conductors each carrying voltage waveforms 2π/3 radians (120° or ⅓ of a cycle) offset in time. Public power facilities that deliver electric power to domestic, industrial, and commercial buildings in most nations including, e.g. the United States and much of Europe, generate three-phase power. Although voltage produced by these power facilities typically varies throughout the world, e.g. 460V 60 Hz in the United States versus 230V 50 Hz in much of Europe, the 120° phase separation of a three-phase system is always approximately constant, as it is a defining characteristic of three-phase power.

Three-phase electric power is appropriate for various forms of electric equipment including e.g., motor drives, appliances, boilers, space heaters, electric arc furnaces, rail cars, air conditioning units etc. Typically, these applications are designed around a balanced three-phase power input. Balanced power is a result of all three phases having a substantially identical voltage and a 120° shift in phase with respect to each other. Balanced three-phase power has several distinguishing characteristics. First, balanced power provides constant, non-time varying electric power transfer. Constant power transfer is a desirable condition, as large motor drives and generators will run much more smoothly on constant power than on varying input power. Second, balanced power systems have zero neutral current. This ensures a more efficient delivery of electric power. To take advantage of these balanced phase characteristics, most three-phase load devices are designed to run on balanced three-phase power.

AC variable frequency motor drives are a good illustration of a common device that derives power from three-phase electric power input. Such motor drives are robust pieces of equipment used in commercial and industrial facilities capable of years of dependable service. More specifically, simple design, inherently high starting torque, and high efficiency are common characteristics. Typical applications include driving machinery, e.g. industrial pumps, fans, blowers, compressors, conveyors belts, etc. In addition, three-phase motor drives are more compact, require less current and consequently can produce less heat, are less expensive, and vibrate less than comparable single-phase counterparts. Three-phase motor drives are so desirable for medium to high power applications of AC/DC conversion, that single-phase counterparts above 10 horsepower (HP) are exceedingly uncommon. So long as a three-phase motor drive is properly sized, well maintained, and supplied with balanced three-phase power, such a motor drive constitutes one of the most efficient methods for powering contemporary machinery.

As mentioned previously, three-phase power devices typically operate on balanced power. If a phase shift or voltage associated with one of these three phases deviates too much, the three-phase power can become imbalanced and be detrimental to a device. Voltage imbalances can occur on a utility provider's equipment or on a consumer's electric load devices if, for example, too many single-phase loads are added to one or more phases of a three-phase signal. In contrast, a complete loss of one of the phases is the worst case of voltage imbalance. A cause of phase loss can include e.g., a downed power line, a blown fuse on a transformer associated with a phase, a single-phase overload condition, an open winding of a supply transformer providing a phase, a lightning strike, and/or equipment failure associated with one or more of the three phase input lines, etc. Running a device under single-phase conditions for higher than rated loads can result in thermal overload of the device.

As an example, in the case of a three phase AC to DC applications, e.g. AC to DC motor drives and the like, if a device is subject to a loss of phase while running, also known as single-phase operation, under higher than rated load the remaining two phases will continue to power the device (e.g. attempting to supply torque and power required by the motor load). Unfortunately, phase loss will result in an unbalanced input signal. AC to DC power devices (requiring balanced input power) operating under these conditions can overheat, induce transformer failure, etc., if the phase loss condition persists. Therefore phase loss is one of the most common catastrophic failure mechanisms for electronic components and devices running at relatively high power loads.

Complicating this problem in the case of the three-phase motor drive is the fact that these motor drives are typically very dependable; they are often installed only with minimum protection as required by the National Electric Code. The National Electric Code requires overload protection on each input power phase, e.g. fuses or thermal overloads (heaters), sized to prevent the motor drive from drawing too much current, but such protection cannot preclude damage that results from severe voltage imbalance or complete loss of a phase. Therefore, specific measures to obviate phase loss and other severe voltage imbalance can be necessary.

Traditional strategies to protect against single-phase operation include voltage relays or time-delay fuses matched to measure motor drive loading. These strategies proved insufficient, as phase loss still occurred under some conditions. Solid-state phase monitoring devices were developed to provide much more robust protection. Such solid-state phase monitoring devices are typically hardware devices that can be coupled with peripheral components, e.g. a motor drive starter, or can be stand-alone devices. For example, a motor drive starter can be specified with a solid-state overload block instead of a thermal overload. The cost of the solid-state option is comparable to a standard thermal overload. Stand-alone phase monitors are essentially solid-state voltage relays that can sense voltage imbalance. They have output contacts that can be tied into three-phase motor drive control circuitry to take it off line (shut it down, so that it no longer draws power) if a severe voltage imbalance or loss of phase occurs.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for systems and methods that measure a magnitude and a frequency of a three-phase voltage and/or components that derive power from a three-phase voltage (e.g. a three-phase rectifier and DC bus), and compare the measured magnitude and/or frequency with predetermined voltage characteristics indicative of phase loss in a three-phase power system. If such comparison indicates a phase loss (e.g. frequency comparison), an associated load device can be subsequently de-activated (e.g. if a magnitude indicates high converter loading) and removed from power source. to one aspect, a warning can be issued, in lieu of or in addition to removing a device from a power source, to allow for orderly shut down of a motor drive if phase loss under heavy load is detected. The disclosed system has components (e.g. implemented purely via firmware, without a need for hardware components) that can measure a magnitude and frequency of a power source and, by comparing measured and phase loss magnitudes and frequencies, can distinguish between voltage fluctuations that do and do not result from phase loss. Making such distinction can reduce expense incurred by conventional hardware devices that measure a source magnitude only. Such hardware devices can frequently take a load device offline when no real damage is imminent, an occurrence commonly referred to as a nuisance fault.

According to a further aspect, input voltage characteristics of a DC voltage bus (e.g. derived from a diode bridge rectifier) can be analyzed via software and/or firmware components. Such analysis includes a comparison of the input voltage to predetermined voltage characteristics (e.g., magnitude, frequency, and the like) that are associated with phase loss; and, if the comparison indicates a phase loss, a load device can be taken offline (e.g. if a load on a converter is greater than ½ rated power). Such an arrangement reduces costs associated with hardware layouts, and enhances system design and implementation. For example, the a software/firmware comparison can identify a specific band of frequencies, e.g. 94-126 Hz to indicate a phase loss for a three-phase input with fundamental frequency of 47-63 Hz. Typical bus ripple frequency can be 6 times a fundamental frequency, e.g. substantially 360 Hz, whereas bus ripple frequency resulting from input phase loss can be 2 times a fundamental frequency, e.g. substantially 120 Hz. Because typical three-phase power components (e.g. three-phase AC to DC power converters and DC to AC power inverters) already have associated software and/or firmware components, additional programming to measure and such analysis in accordance with the subject innovation can add substantial utility at low cost.

In a related aspect, systems and methods are disclosed that can continuously monitor voltage characteristics associated with a power source, and compare such characteristics to predetermined voltage characteristics associated with phase loss. Based on results of such comparison, load device(s) can subsequently be taken offline (e.g. if an analysis of source frequency indicates phase loss and an analysis of a dc ripple voltage magnitude indicates a system load is approaching a maximum single phase rating). Additionally, if such comparison indicates that a phase loss exists or alternatively that a phase loss condition is imminent, a display device can indicate such occurrence as a warning. For example, a warning that indicates a device is approaching a rated load for single-phasing conditions can allow a system to be taken offline in an orderly manner, or run under reduced load, prior to system shutdown. Continuously monitoring potential risks and providing a warning and/or removing power from a device can assure proper operation of an industrial setting.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

The disclosed innovation is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component," "handler," "model," "system," and the like are also intended to refer to a computer-related entity, either hardware, a combination of hardware and software, software, or software in execution, in addition to electro mechanical units. For example, in addition to mechanical/electrical entities a component may be, but is not limited to being, a process running on a processor, a processor, an object, an executable, a thread of execution, a program, and/or a computer. By way of illustration, both an application running on a server and the server can each be a component. One or more components can reside within a process and/or thread of execution and a component may be localized on one computer and/or distributed between two or more computers, industrial controllers, and/or modules communicating therewith. Also, such components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
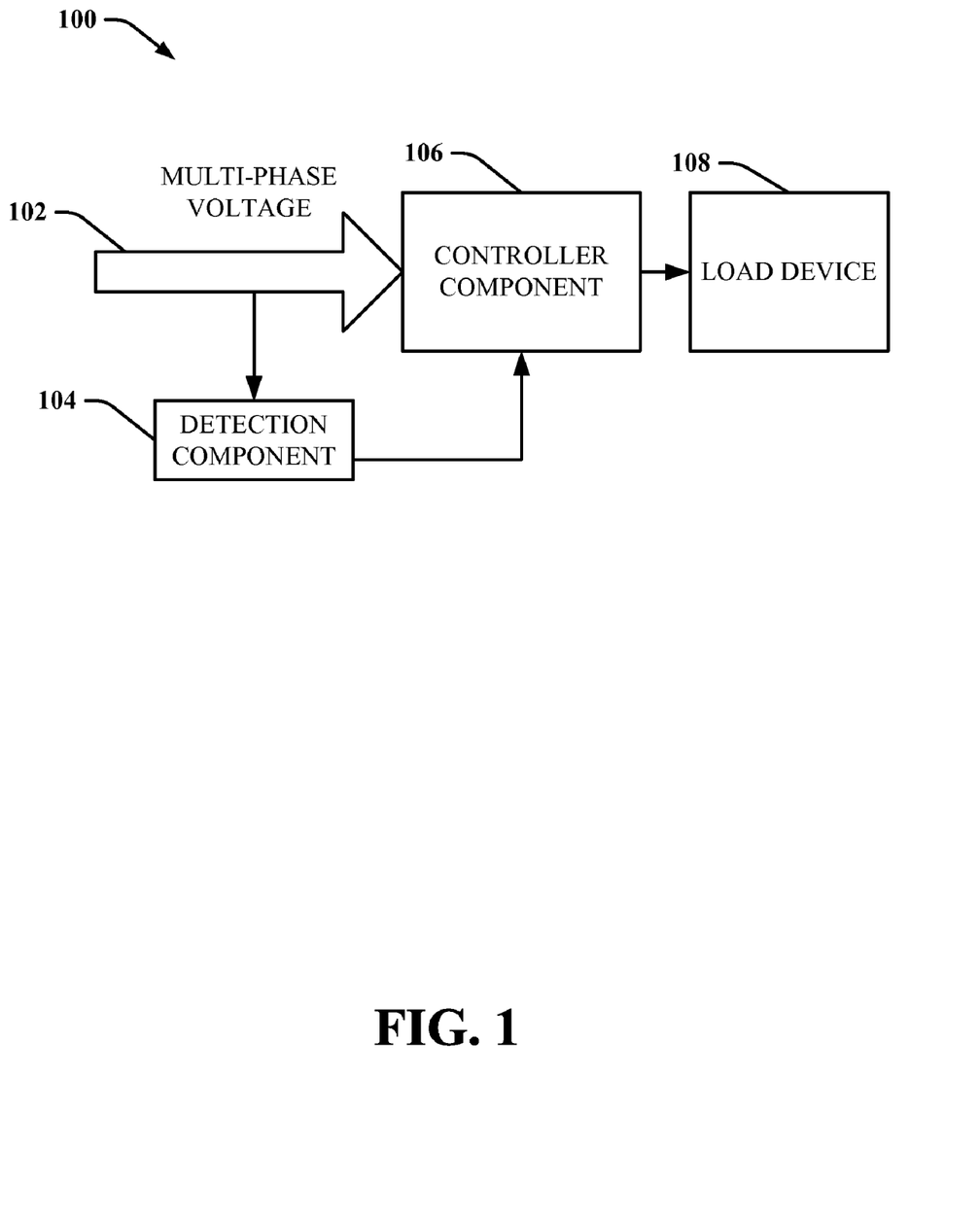
FIG. 1 illustrates an exemplary block diagram for a system that detects a magnitude and frequency of a three-phase voltage in accordance with an aspect of the subject innovation.

FIG. 1 illustrates a system 100 comprising a detection component 104 that can measure characteristics of a multi-phase voltage source 102, and a controller component 106 that can compare measured characteristics to predetermined criteria (e.g., voltage characteristics from phase loss in a multi-phase system). Subsequently, if such comparison indicates a phase loss, an associated load device 108 is taken offline (e.g. shut off from electric power). Moreover, characteristics of a multi-phase voltage source (e.g. that provides power to an AC motor drive) 102 can include, a voltage magnitude and voltage frequency, for instance. Examples of multi-phase load devices include industrial units such as three-phase motor drives, pumps, fans, blowers, compressors, conveyors belts, and the like. In general, load devices can have substantially equal impedance or resistance on each phase of a multi-phase power source, also referred to as phase balancing, or descriptive of a phase-balanced device. Balanced multi-phase systems can exhibit features such as constant power transfer and zero neutral current, for example. Detection component 104 can measure characteristics of electric power (e.g., via voltmeters, multi-meters, and the like), and can be implemented in hardware, software, firmware or combinations thereof.

Controller component 106 can compare source voltage(s) characteristics to predetermined voltage characteristics (e.g., magnitude and frequency) related to input phase loss. If a comparison establishes that a phase has been lost, controller component 106 can indicate a phase loss has occurred and/or shut down power to a load device. Controller component 106 can be located proximate a load device, a power converter for a load device, detection component 104, another system component, combinations thereof, or separate from other system components. It is to be appreciated that controller component 106 can be comprised wholly of firmware components (e.g. in general the comparing act(s) is performed without employing hardware components.)

In addition, the subject innovation mitigates a risk of premature shut-down via analyzing additional input voltage characteristics. Most electrical components can tolerate a degree of input voltage fluctuation without suffering harm, especially if current decreases with increasing voltage e.g. constant power systems. Generally, voltage fluctuations not associated with phase loss will not greatly increase current drawn by a load device. Although some damage can result, such damage is much more infrequent and generally minor in degree. Consequently, shutting off power to a load device as a result of voltage fluctuation alone can be premature and lead to unnecessary downtime, troubleshooting, and a need to manually restore power to a system. To counter premature shut down, alternative and/or additional input voltage characteristics can be measured and compared with characteristics known to occur during phase loss and not during typical operation. Such measurement of phase loss can further improve distinction between a balanced three-phase system and a phase loss condition.

For example, acceleration, deceleration, or a constant load of a three-phase motor drive can cause a time varying voltage component (ripple voltage) on a DC voltage bus supplying the three-phase motor drive with power. Such ripple can typically be a function of an impedance and/or capacitance of the three-phase motor drive and can have a frequency substantially similar to 360 Hz (e.g. substantially 6 times a fundamental frequency of an AC input voltage). However, when phase loss occurs, ripple on a DC voltage bus can be substantially similar to 120 Hz (e.g. substantially 2 times a fundamental frequency of an AC input voltage, and/or substantially ⅓ of a DC ripple frequency associated with non-phase loss conditions). Consequently, measuring a voltage ripple frequency and comparing the measured frequency to a 120 Hz, or substantially similar (e.g. 94 Hz-126 Hz, etc.) signal associated with phase loss can enable distinction between voltage fluctuations caused by phase loss and voltage fluctuations caused by less detrimental circumstances.

Figure 2:
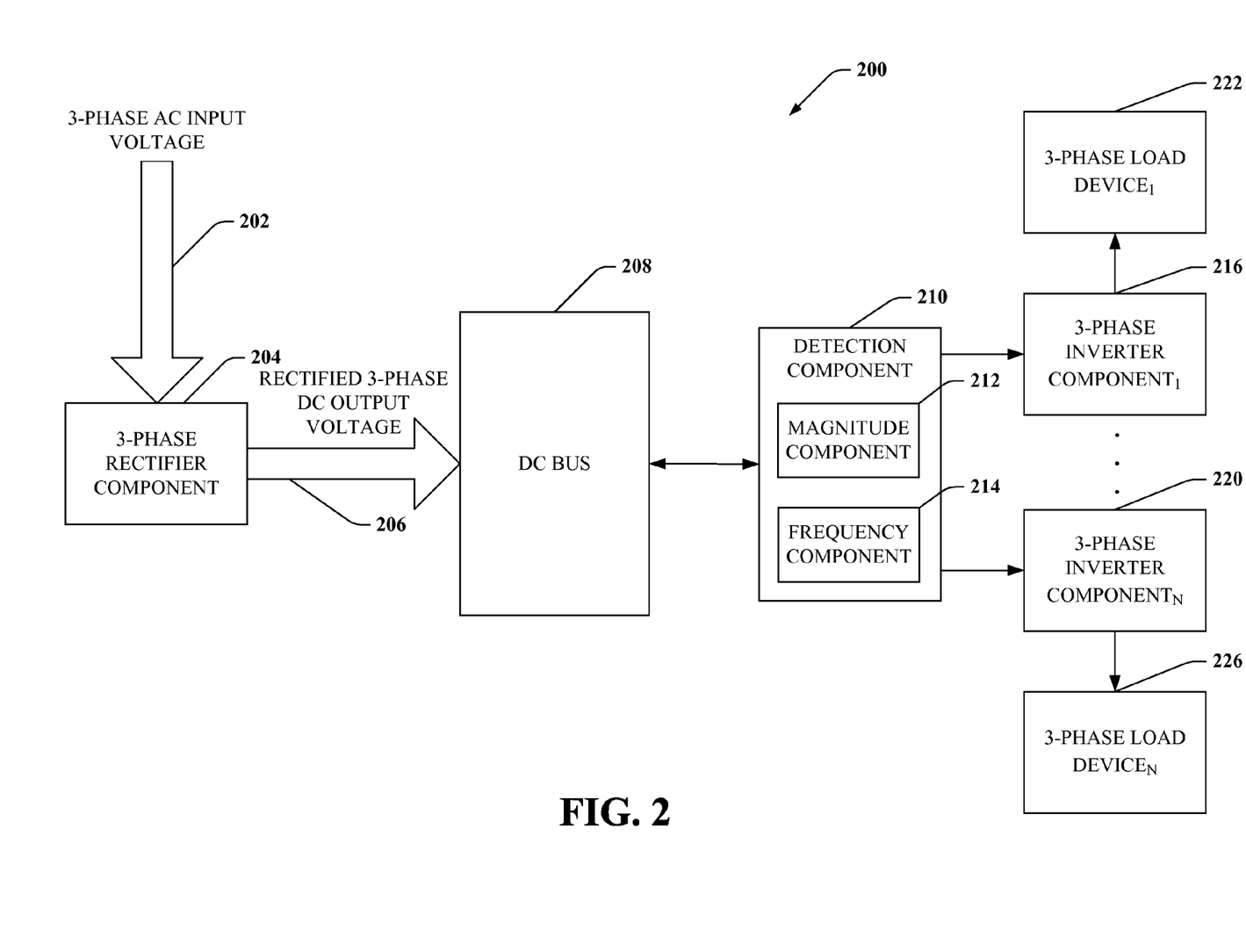
FIG. 2 illustrates a detection component that further comprises magnitude and frequency components, according to one particular aspect of the subject innovation.

FIG. 2 depicts a system 200 that can measure and/or monitor a magnitude and frequency of a DC voltage bus to determine whether a phase loss has occurred in accordance with the subject innovation. Three-phase AC input voltage 202 can be an AC voltage conforming to three-phase voltage specifications provided by typical public power utilities. Typically, three-phase AC input voltage will have three electric input signals with frequencies that are substantially 120° out-of-phase, e.g., frequencies of 47-63 Hz and phase shift of substantially 120°. Voltage magnitudes of the three electric signals can be substantially equal. Three-phase AC input voltage can include AC electricity generated by most electrical utility companies in most nations worldwide—for example, in the United States AC electricity generated by electric utility companies and made available to public, private, and governmental entities is generally three-phase electric power. Although many utility companies in the US convert three-phase power to single-phase power before making such power available in a domestic home, three-phase power is generally still available even to domestic homes on request.

Three-phase rectifier component 204 can transform AC electricity to DC electricity, e.g., an AC to DC converter. Such a device can further convert three-phase AC power to DC power. DC bus 208 can maintain one or more voltages that typically do not substantially vary with time. Furthermore, DC bus 208 can supply DC power to one or more DC electrical components, such as DC to AC inverters, DC load devices, and other DC electronic components, for example. Detection component 210 can further include a magnitude component 212 and frequency component 214, which measure and/or monitor a voltage magnitude and frequency of DC bus 208 and/or devices deriving power from DC bus. Three-phase inverter component(s)$_{1-N}$, (where N is an integer) 216-220, can transform DC electricity to AC electricity, e.g., an inverter. Such a device can convert DC electricity to three-phase AC electricity, wherein the three signals forming three-phase AC electricity inverted by three-phase inverter component(s)$_{1-N}$, 216-220, can each have different electrical characteristics, such as voltage, frequency, and/or phase.

Examples of uses for three-phase AC to DC rectifiers and inverters include converting an input source to DC voltage to run DC equipment and providing a DC source voltage that can be inverted to three-phase AC power customized voltage magnitudes associated with each of the three signals. If, for instance, characteristics of three-phase AC input power 202 do not sufficiently match those required by load devices that draw power from DC bus 208, a DC power bus can act as a source for various DC to AC inverters to customize characteristics of three-phase AC signals.

Three-phase load device(s)$_{1-N}$, 222-226, can be a hardware device capable of running off of three-phase AC or DC electricity. Examples can include electric appliances, refrigerators, stoves, ovens etc., electric motor drives, street rail cars, welding torches, air conditioning units, etc. Typically three-phase load device(s)$_{1-N}$, 222-226, run off of balanced three-phase electricity, as described herein. Alternately, depending on requirements of a particular load device, three-phase power can be unbalanced in phase, magnitude, frequency (if AC) etc. by three-phase inverter component(s)$_{1-N}$, 216-220.

For instance, three-phase inverter component 216 could convert DC voltage from DC bus 208 into three-phase AC voltage, each single-phase component having voltage and/or current magnitudes higher and/or lower than balanced magnitude values.

Three-phase load device(s)$_{1-N}$, 222-226, can also be DC devices that run directly off of DC bus 208, without need for DC to AC power conversion (e.g. when used in variable frequency motor applications, where DC to AC conversion is not possible). In such instance, a step up or step down transformer (not shown) can increase or decrease a magnitude of voltage and/or current drawn by a DC load device from DC bus. Alternatively, DC bus 208 can include step up and step down transformers, providing multiple DC voltage and/or current values for DC load devices and/or three-phase inverter component(s)$_{1-N}$, 216-220.

Figure 3:
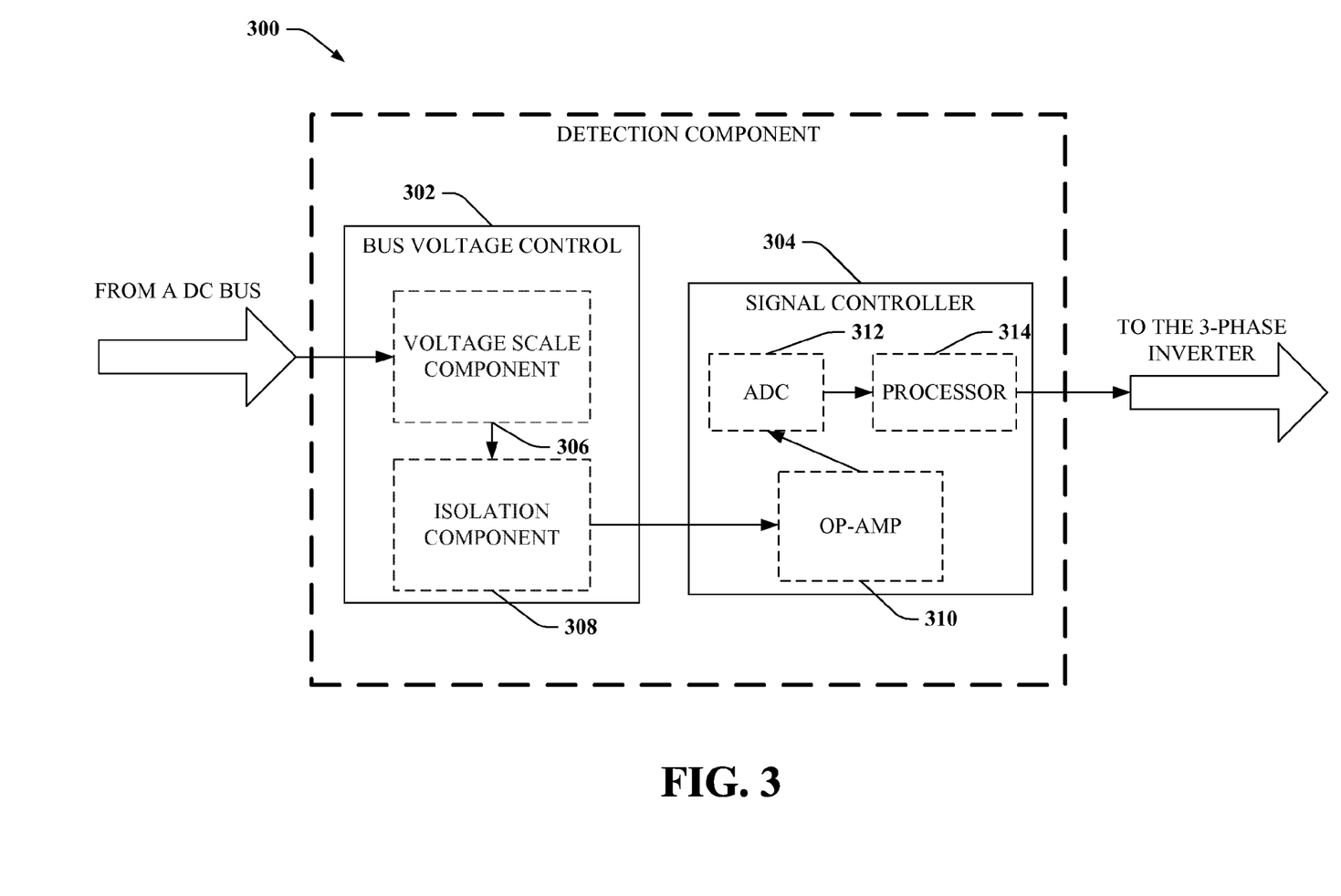
FIG. 3 depicts a system that can take a load device offline according to an aspect of the subject innovation.

FIG. 3 illustrates a detection component 300 that can measure and/or monitor a magnitude and frequency of one or more three-phase electric power sources in accordance with the subject innovation. Detection component 300 can be implemented via combinations of hardware, software, and/or firmware. It is to be appreciated that FIG. 3 illustrates an exemplary arrangement and other alternative implementations are well within the realm of the subject innovation.

Bus voltage control 302 can receive (e.g. by way of a series of resistors acting as a voltage divider on a power source) an AC input voltage, a DC input voltage, and/or a time varying component of a DC voltage (e.g. DC ripple voltage created by an impedance and/or capacitance of a three-phase load device that can increase proportionately with a load on such device), transform a voltage magnitude and/or isolate a voltage from other signals. The bus voltage control 302 can include components of a programmable logic control (PLC) device that measure a voltage of a power source to control power delivered to a load device (e.g. AC to DC motor drives). Moreover, signal controller 304 can receive an isolated voltage signal from bus voltage control 302, convert it to a digital signal, and process that digital signal for subsequent logical control of an electrical system.

The bus voltage control can further include a voltage scale component 306, and an isolation component 308. Voltage scale component 306 can increase or decrease a magnitude of a voltage (e.g. via a transformer) received at bus voltage control 302. Voltage scale control 302 can preserve sensitive elements of the detection component 302 by mitigating electrical power associated with the received signals. Isolation component 308 can prevent unshielded electric or magnetic signals from distorting characteristics of a signal generated by a DC power bus, for example. Such isolation can ensure that a signal analyzed at detection component 302 truly represents the voltage conditions. Isolation component 308 can further transmit an isolated voltage to signal controller 304 at an input operational amplifier (op-amp) 310.

Input op-amp 310 can receive an analog signal and convert it into an appropriate signal for conversion to a digital signal. ADC 312 is an analog to digital converter that can convert an analog voltage signal to a digital signal thereby transforming the characteristics of the original analog signal into digital format (e.g. an analog ripple voltage into a binary number, hexadecimal number, or the like, that represent characteristics such as magnitude and frequency of the ripple voltage). ADC 312 can receive an analog signal (e.g. magnitude and frequency of a DC bus voltage measured by detection component 300) and convert such analog signal into digital form for analysis by a processor (e.g. processor 314, or controller component 106 depicted in FIG. 1). The digital signal is then sent to processor 314, which can perform logic functions on digital information (e.g., a digital signal microprocessor that can perform low, high, and band-pass frequency and magnitude filtering, fast fourier transform (FFT) filtering, comparisons between signal and threshold values, mathematical functions including multiplication, division, absolute value operations and the like.)

Processor 314 can isolate voltage components related to single-phase operation (e.g. having a frequency signifying a single-phase event, as described herein) from voltage components related to standard operation of a three-phase load device. Such isolation can be accomplished by applying a frequency filter (e.g. band-pass, FFT, and the like) to a digital ripple voltage signal, for example. The frequency filter can define a high and low ripple frequency associated with a phase loss condition on an input power source. Once isolated, single-phase voltages can further be compared to a predetermined threshold (e.g. a power rating of a load device or AC/DC converter) for a predetermined period of time. If a voltage magnitude rises above the predetermined threshold for a predetermined period of time, processor 314 can indicate a dangerous phase loss condition has occurred, initiate shut down procedures, post a fault at an external system monitoring device, or combinations thereof.

The following example is presented to provide context for the operations performed by signal controller 304, and most specifically processor 314. In the context of the subject innovation, a ripple voltage frequency from phase loss can be substantially equal to 120 Hz. Processor 314 can filter a digital signal representing a voltage of a DC bus with an appropriate frequency filter (e.g. band-pass, FFT, and the like) to isolate phase loss ripple from standard operation ripple. For example, the band band-pass filter can pass a frequency range of substantially 94 to 126 Hz. Consequently, voltages with such frequencies are typically forwarded to processor 314 for subsequent logical operations; voltages of other frequencies typically are not. Subsequently, voltage magnitudes within the typical single-phase frequency range are compared to a predetermined threshold magnitude value, e.g. a single-phase power rating of a load device or AC/DC converter. Such comparison can indicate single-phase power drawn by a load device. If a voltage magnitude rises above the predetermined threshold of single-phase power for greater than a predetermined period of time, a potentially dangerous condition can occur. Thereafter, the processor 314 takes appropriate action such as: shutting down power to the load device, notifying other units to perform the shut down, and the like.

Figure 4:
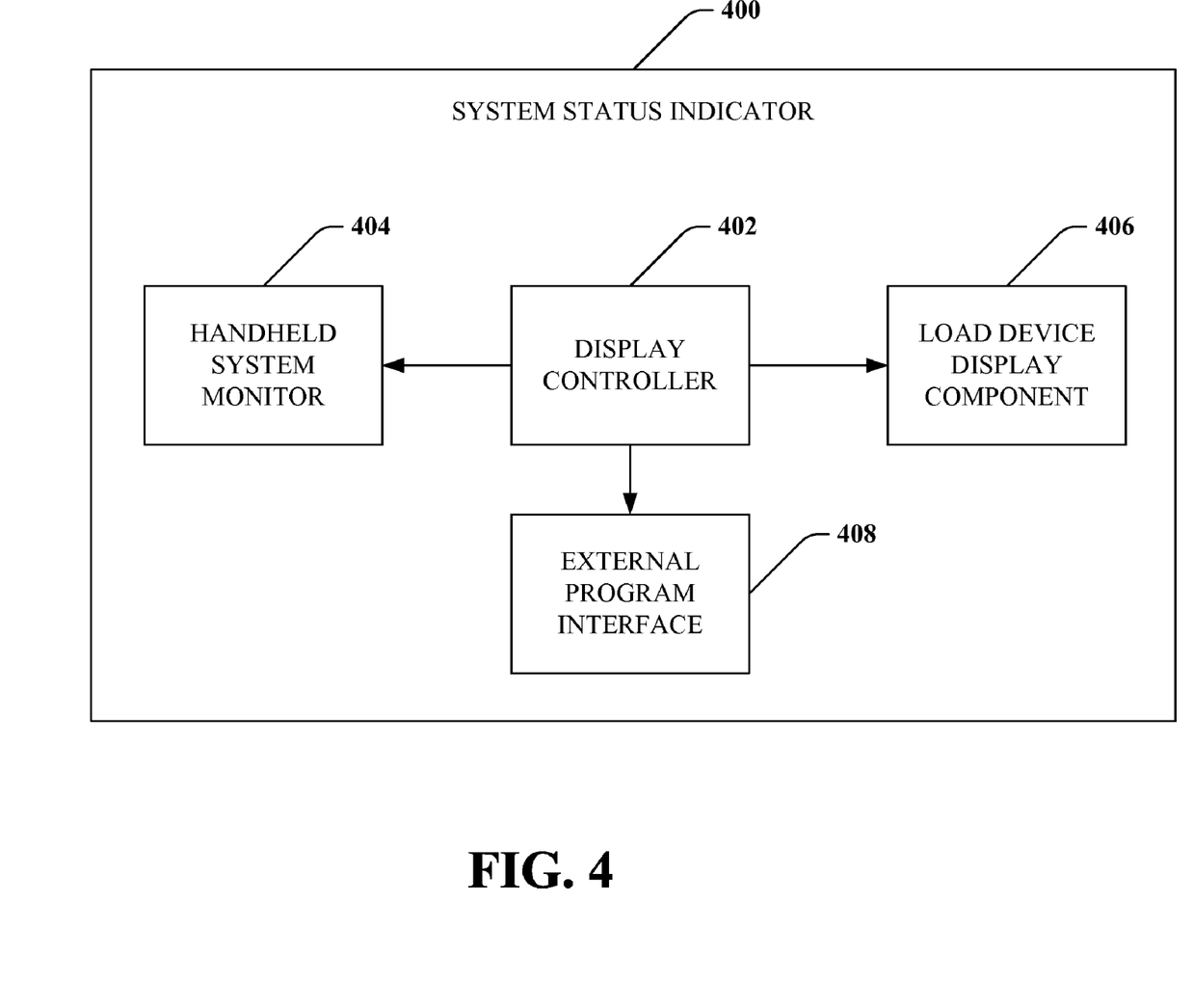
FIG. 4 illustrates a display system that indicates occurrence of a phase loss, according to a particular aspect of the subject innovation.

FIG. 4 depicts an example system 400 that indicates a status of an electrical system, including a loss of phase condition. Phase loss indicator 400 includes a display controller 402 that can monitor a status of an electronic system and can update system monitoring devices to indicate such status. Status of an electronic system can include a condition relating to a measurable state of an electronic power supply, electronic components, and/or operation of electronic load devices, including e.g. normal operation, low voltage condition, high voltage condition, high temperature condition, system online condition, system offline condition, phase loss condition etc. Display controller 402 can be one component or a series of interconnected components that interface with one or more segments of an electrical system and one or more display devices.

A system monitoring device can be an electronic and/or computational device or devices that can indicate a status of an electric system, including, e.g., a handheld display device 404, a load device display component 406, an external program interface 408, etc. One mechanism for indicating a status of a system is to update a user interface (UI) display of a system monitoring device to indicate such status. Such system monitoring devices can notify an external entity of a status of a system and a need to take remedial or precautionary measures.

For example, if a phase loss condition occurs and is detected in accordance with the subject innovation, a load device can be deactivated and shut down. Display controller 402 can update an external program interface 408 to indicate that the load device has been shut down due to a loss of phase condition. Furthermore, it may suggest a remedial measure, e.g. restoring proper three-phase power before restarting the load device. An entity monitoring a load device may notice it is not being powered, but may not otherwise know why. That entity can consult, for example, external program interface 408 to determine information about the shutdown, and additionally information about correcting it. It should be appreciated that many other variations of this example to indicate a status of a system are contemplated; the foregoing example should not be construed as to limit the subject innovation to the specific aspects recited therein.

Figure 5:
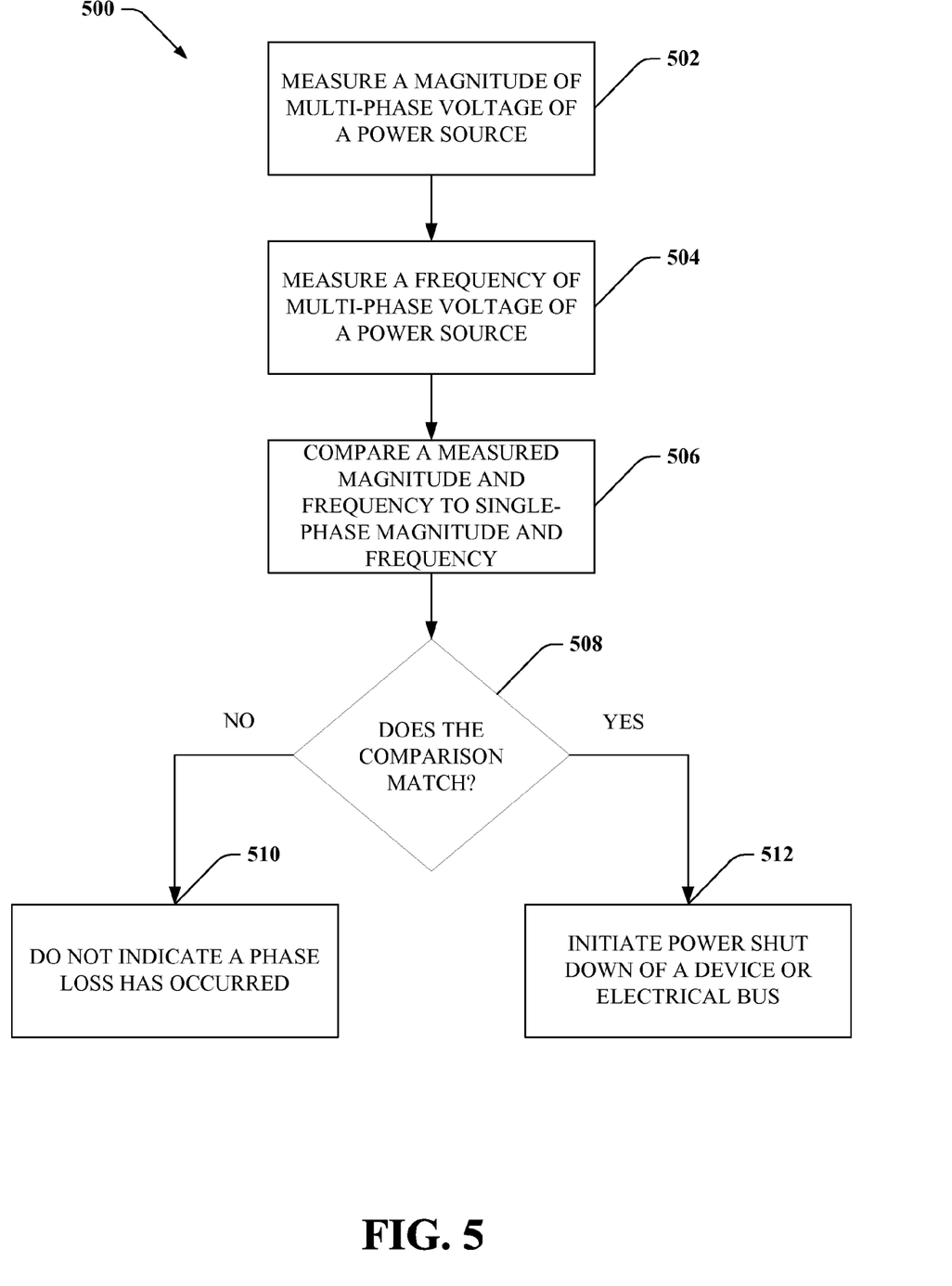
FIG. 5 illustrates a methodology of determining whether a phase loss has occurred and shutting down a load device in accordance with an exemplary aspect of the subject innovation.

FIG. 5 depicts a methodology of phase loss detection for an electronic system in accordance with the subject innovation. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

As illustrated, methodology 500 can detect a phase loss condition, indicate such a condition exists, and/or initiate shut-down procedures to protect electronic components. Occurrence of a phase loss for a three-phase system can be distinguished from a balanced three-phase input by analyzing voltage characteristics of a related input. At 502, a magnitude of a multi-phase voltage of a power source is measured. The measurement can be performed by a hardware, software or firmware component, or a combination thereof, that can identify a magnitude of an AC and/or DC voltage, including e.g., a voltmeter, a multi-meter etc. At 504, a frequency of a multi-phase voltage of a power source is measured. The frequency measurement can also be performed by a hardware, software or firmware component, or combinations thereof that can identify a frequency of an AC voltage and/or a time-varying ripple component associated with a DC voltage. In general, a software and/or firmware component will be the lowest in cost.

At 506, measured magnitude and frequency values are compared to voltage characteristics associated with loss of one or more phases of a multi-phase system. At 508, a determination is made as to whether the measured characteristics match those associated with phase loss. If not, methodology 500 proceeds to 510 where no indication of a phase loss condition is made. Otherwise, the methodology 500 proceeds to 512 where power shut down of a device or electrical bus is initiated. Initiation of power shut down can include, e.g., indicating a phase loss has occurred to other entities so that further action can be taken, indicating to another system component that a load device need be taken off line, and/or transmitting a signal to a power shut down component that can cut power to a load device.

The following example is included to provide context for methodology 500, and is not intended to limit the innovation as would be understood by one of skill in the art. A balanced three-phase AC voltage may have a relatively constant magnitude of 240 Volts and frequency of 60 Hz. If a loss of phase occurs in a three-phase electric signal, voltage magnitudes can fluctuate greatly (e.g. as a result of increasing load), and a frequency shift e.g. a frequency other than 60 Hz, can occur as well. If measured voltage values indicate a peak magnitude of 400 volts for instance, (e.g. for a system where nominal voltage is 240AC*Sqrt(2)=339VDC) and separate frequency components result in a substantial shift from a nominal frequency of 60 Hz (e.g. or wherein a DC voltage bus deriving power from such AC input exhibits a ripple voltage having substantially 120 Hz frequency), then a phase loss condition has likely occurred on the input power signal. Methodology 500 initiates a power shut down sequence when such a condition occurs, as described supra. Generally, measuring two or more characteristics of a multi-phase power source, e.g. magnitude and frequency, can help to distinguish phase loss conditions from other relatively minor conditions that cause voltage magnitude fluctuations. Expenses that result from unnecessarily taking a load device offline can be avoided utilizing the disclosed method.

Figure 6:
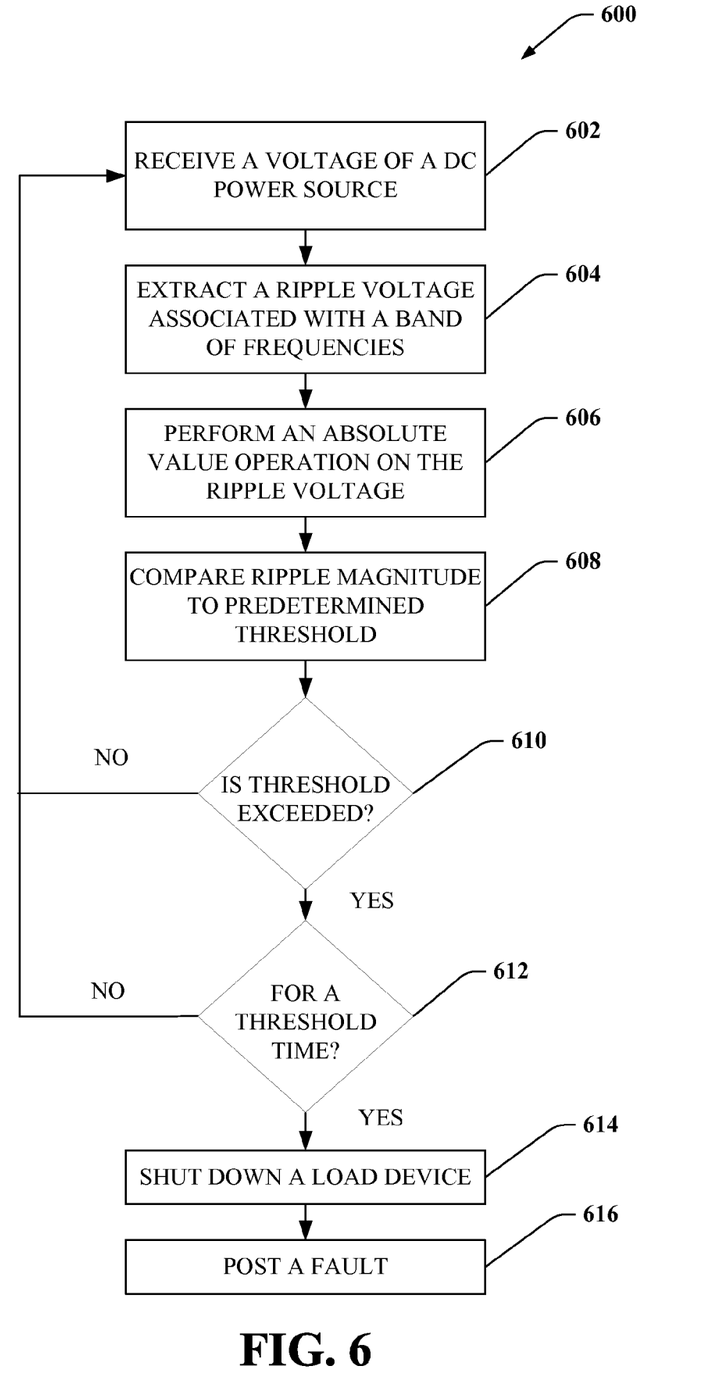
FIG. 6 depicts a methodology of determining whether a phase loss has occurred by measuring a voltage of an electronic bus in accordance with a particular aspect of the subject innovation.

FIG. 6 illustrates a methodology 600 of detecting a phase loss in a three-phase system. At 602, a voltage of a DC power source is received. The DC bus voltage can be received via a voltage divider (e.g. series of resistors on a power source) that can further step down the voltage magnitude (e.g. acting as a step transformer, etc.). At 604, portions of the voltage signal having frequency components within a predetermined band of frequencies are extracted from the received signal. The extracted voltage component is termed a ripple voltage. Such extraction can occur, for instance, via an analog to digital converter and a subsequent filtering operation (e.g. band-pass or (FFT) filter or the like). Further, the band of frequencies can include those frequencies characteristic of a loss of phase on an input power source, as described herein. At 606, an absolute value operation is performed on the ripple voltage. The absolute value operation provides more magnitude values per cycle of ripple voltage signal, providing more measurement points per unit period of time.

At 608, magnitude values of the filtered ripple voltage are compared to a predetermined threshold. The predetermined threshold can be, e.g. a power rating of a load device or AC/DC converter. Typically load devices can operate under single-phase conditions up to a certain amount of power (e.g. a device can be rated at 50% nominal power for single-phase operation). The fluctuating power effects of phase loss conditions are not significant when a load device is drawing little or no power. It is typically only when a load device is drawing a substantial amount of power under phase loss conditions, that catastrophic failure of electrical components or load devices can occur.

It should further be noted that acts 604, 606, and 608 could be performed wholly via software and/or firmware components, without need of additional hardware other than that typically associated with a programmable logic controller that monitors a load device. In this context, firmware methods provide advantage over hardware alternatives. First, cost associated with firmware measurement is generally lower than comparable hardware devices that can filter, transform, and compare voltage characteristics. Second, firmware components provide much more flexibility and allow for greater logical signal operation (e.g. filtering, and the like), which is helpful to prevent shutting a motor drive down when no real danger is imminent (e.g. a nuisance fault). Third, some software and/or firmware are typically implemented within hardware devices that perform logic functions so redundancy is avoided in the subject innovation. Performing detection and logic functions in firmware can streamline a measurement and detection process. Fourth, firmware is more capable of performing valuations for multiple devices with a single implementation, by converting multiple analog inputs to digital form. Hardware alternatives, on the other hand, require additional components connected to each additional input.

At 610, a determination is made as to whether the predetermined threshold has been exceeded by the extracted magnitude. If not, methodology 600 returns to 602, where a ripple voltage is again received for further action specified at 604 through 610. If so, methodology 600 proceeds to 612, where a further determination is made as to whether the threshold magnitude is exceeded for a predetermined threshold period of time. If so, methodology 600 proceeds to 614, and a load device is shut down. At 616, a fault is posted. The fault can indicate diagnostic information associated with an electrical system (e.g. an error and a source caused the error); in the context of the subject innovation, the posted fault can indicate a phase loss condition at a power input. It is to be appreciated that prognostic analysis based on power levels, fault tolerance specifications, etc. related to an electrical system can be implemented in conjunction with methodology 600.

Figure 7:
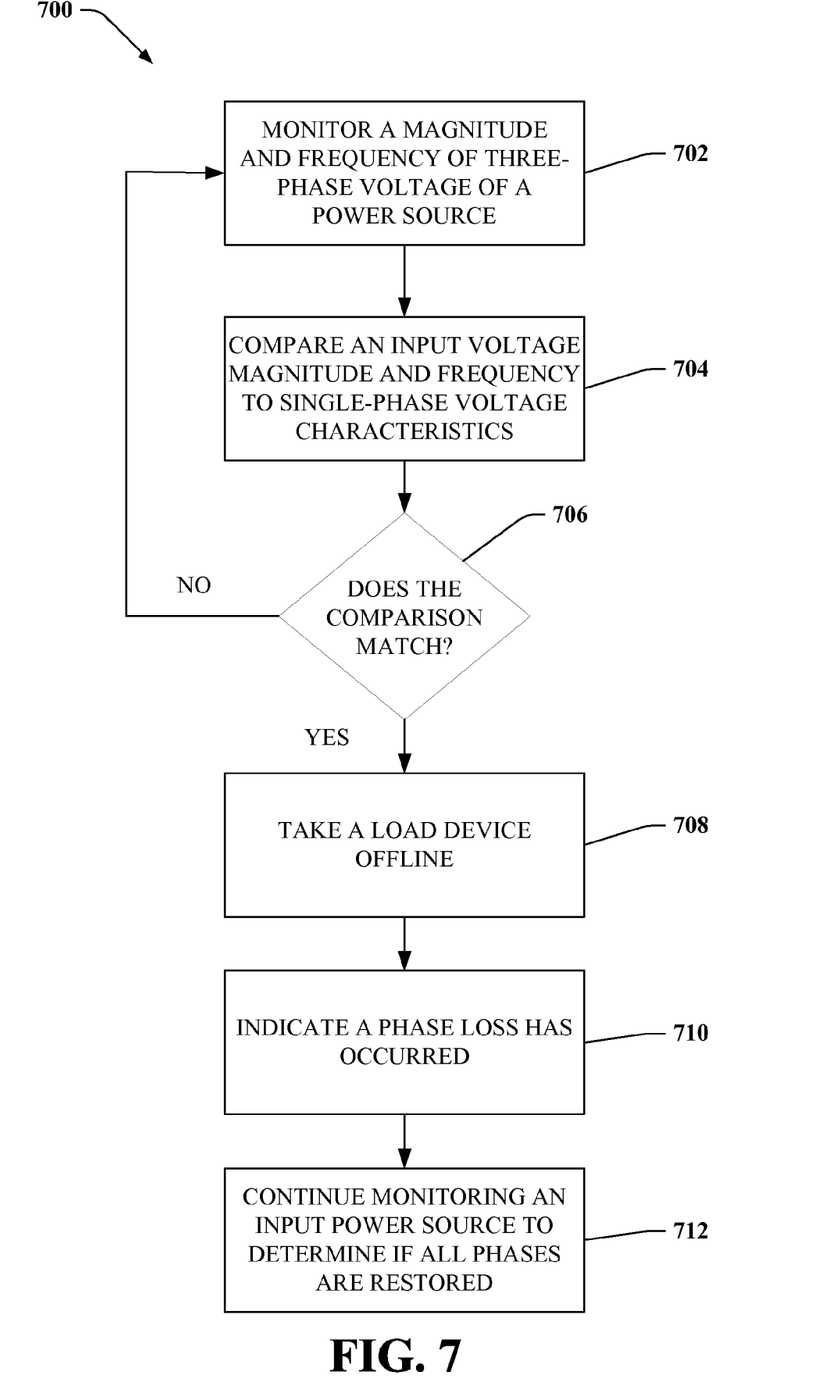
FIG. 7 illustrates a methodology of monitoring a three-phase power source to detect a phase loss.

FIG. 7 depicts a methodology 700 for continuously monitoring a power source to detect a phase loss condition, and taking remedial measures to protect devices that derive power from the power source. At 702, a magnitude and frequency of a three-phase power source is continuously monitored to identify and oversee contemporaneous magnitude and frequency values and changes in those values. Measurement can be performed via hardware, software and/or firmware components. One example of a continuous monitoring device could be a waveform meter that monitors a frequency and magnitude waveform of a voltage. Changes in the waveform could trigger a comparison to single phase values at 704. Alternatively, comparisons may be done at regular or irregular times, or continuously by comparing the voltage waveform with a phase loss waveform.

At 704, comparisons are made between input voltage magnitude and frequency and a magnitude and frequency associated with phase loss. As stated, comparisons can be made over intervals of time, or continuously. At 706, a determination is made as to whether a phase loss has occurred as a result of a comparison performed at 704. If phase loss has not occurred, methodology 700 returns to 702 where monitoring continues. Otherwise and as indicated by act 704, the methodology 700 proceeds to 708 where a load device is taken off line. At 710, an indication is made that a phase loss has occurred. The indication performed at 710 can include updating a user interface display of an integrated or external display device, including e.g., a handheld display device, a load device display component, an external program interface, etc. At 712, monitoring of an input power source is continued to determine whether all phases of the three-phase input power are restored.

Figure 8:
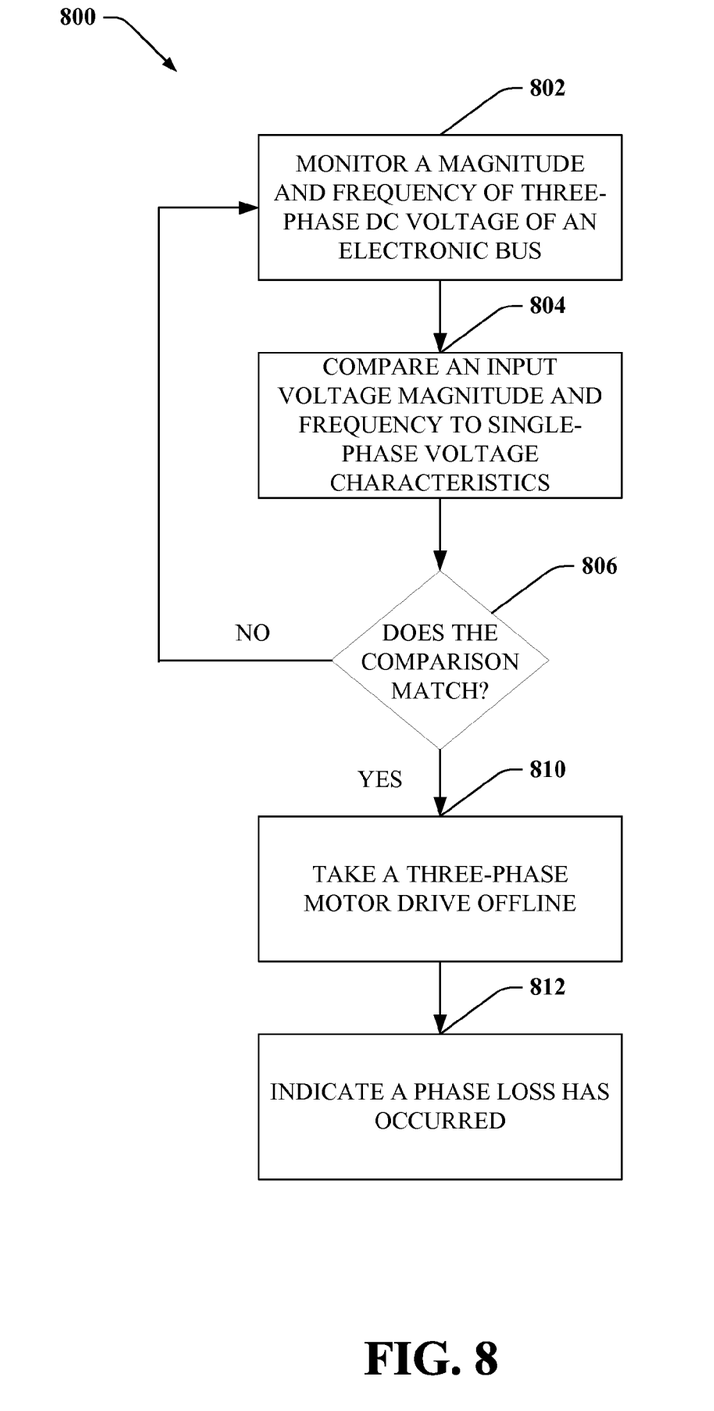
FIG. 8 illustrates a methodology of measuring a three-phase DC voltage of an electronic bus to determine whether a phase loss has occurred and protect components powered by the electronic bus.

FIG. 8 illustrates a methodology 800 that continuously monitors a magnitude and phase component of a DC voltage of a DC bus to detect a phase loss condition. At 802, a magnitude and frequency of a DC voltage on a DC bus are continuously monitored. Typically a DC voltage has no time-varying component, and consequently no frequency associated therewith. However, load devices can often introduce some fluctuation, or ripple, into an otherwise constant DC voltage as power drawn by those devices changes over time (e.g. proportionate to the load draw by the device). For example, a three-phase motor drive deriving power from a DC bus, through a DC to AC inverter for instance, can draw varying amounts of current as the motor drive accelerates and decelerates under heavy load. Drawing high levels of electrical power can introduce a time varying component into an otherwise constant DC voltage. Ripple voltages can be a function of impedance and/or capacitance of a load device, and thus can be anticipated in normal operation. Typically, electronic system designers do anticipate a certain degree of ripple voltage and therefore components are generally manufactured to handle a modest amount of ripple without detriment.

At 804, a voltage magnitude and frequency of a DC power bus is compared to a voltage magnitude and frequency associated with phase loss. For example, DC voltage ripple (such as from constant load, acceleration, or deceleration) associated with a three-phase motor drive can typically have a frequency of 360 Hz or frequency substantially similar thereto (when an input signal is 47-63 Hz for instance). DC voltage ripple associated with phase loss, however, can typically be substantially similar to 120 Hz. Therefore, by comparing ripple frequency of the DC power bus with characteristics associated with phase loss, voltage fluctuations induced by non-dangerous conditions can be distinguished from those introduced by dangerous phase loss conditions.

At 806, a determination is made as to whether a phase loss condition has occurred based on a comparison performed at 804. If a phase loss has not occurred, methodology 800 returns to 802 where a magnitude and frequency of a DC bus voltage is continuously monitored. If, at 806, a determination is made that a phase loss condition has occurred, methodology 800 proceeds to 810 where a three-phase motor drive is taken offline to protect the drive and a power inverter coupled with the drive. At 812, an indication is made that phase loss has occurred. The indication performed at 710 can include updating a user interface display of an integrated or external display device, including e.g., a handheld display device, a load device display component, an external program interface, etc.

Figure 9:
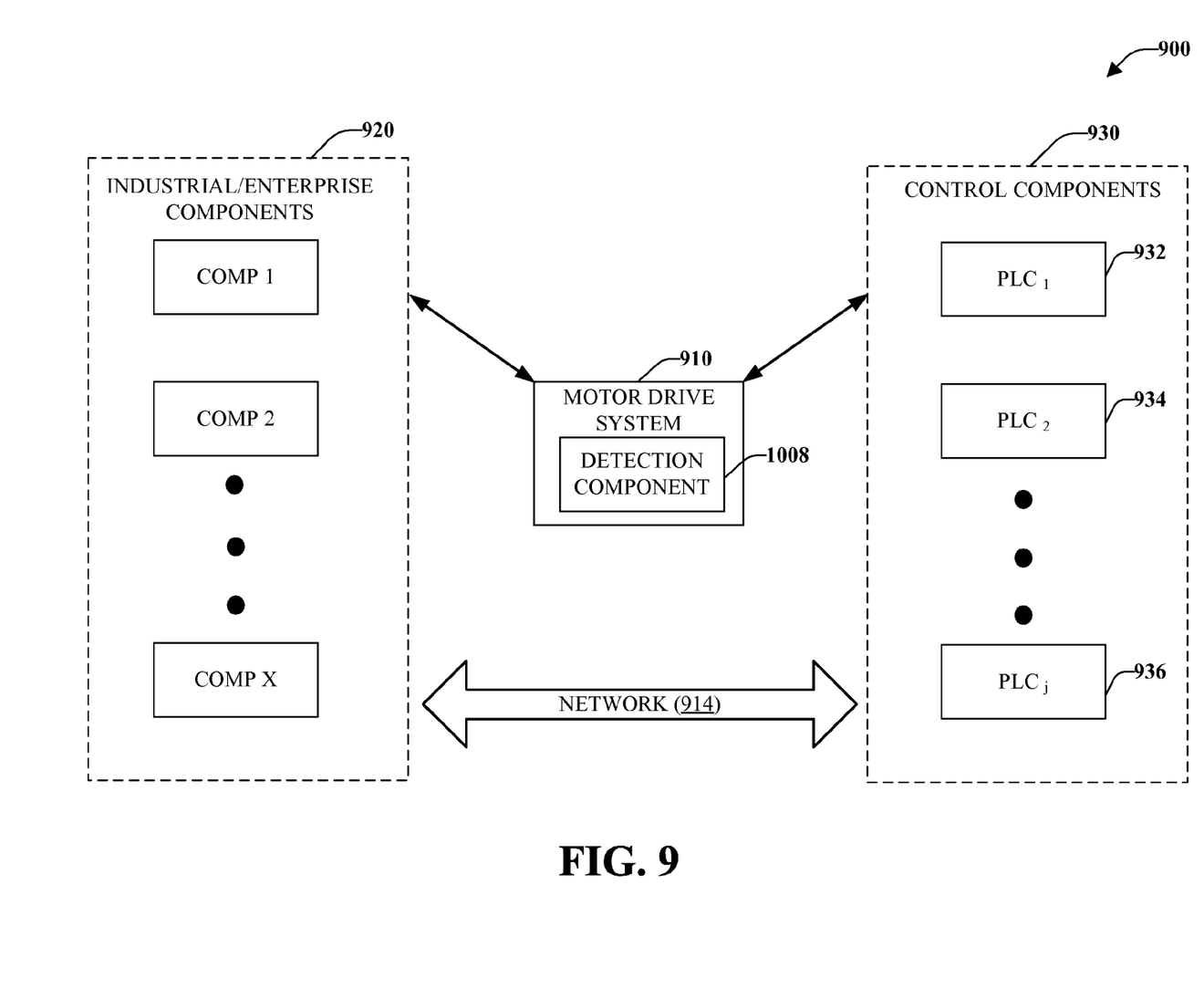
FIG. 9 illustrates an exemplary industrial setting that can incorporate various aspects of the subject invention.

FIG. 9 illustrates a block diagram for an industrial network system 900 in accordance with an aspect of the subject innovation. Functional blocks for control algorithm of the motor drive system 910 can be part of applications running with/or on the control components 932, 934, 936 (1 to j, j being an integer) which can function as a management control center for the industrial network system 900. Accordingly, a framework is provided, such that voltage characteristics of a DC voltage bus, measured by control components 930 in conjunction with supplying predetermined operation requirements of motor drive system 910 (e.g. motor drive velocity, direction, band-pass power sensors etc.), can be further applied to prediction of AC input phase loss to prevent catastrophic failure (e.g. fire, explosion, destruction of electrical components etc.) in motor drive system 910.

A network system 914 can be associated with the industrial automation system 900. The network system 914 can further include additional hosts (not shown), which may be personal computers, servers or other types of computers. Such hosts generally can be capable of running or executing one or more application-level (or user-level) programs, as well as initiating an I/O request (e.g., I/O reads or writes). In addition, the network system can further include one or more input/output units (I/O units), wherein such I/O units can includes one or more I/O controllers connected thereto, and each of the I/O can be one of several types of I/O devices, or combinations thereof, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

Figure 10:
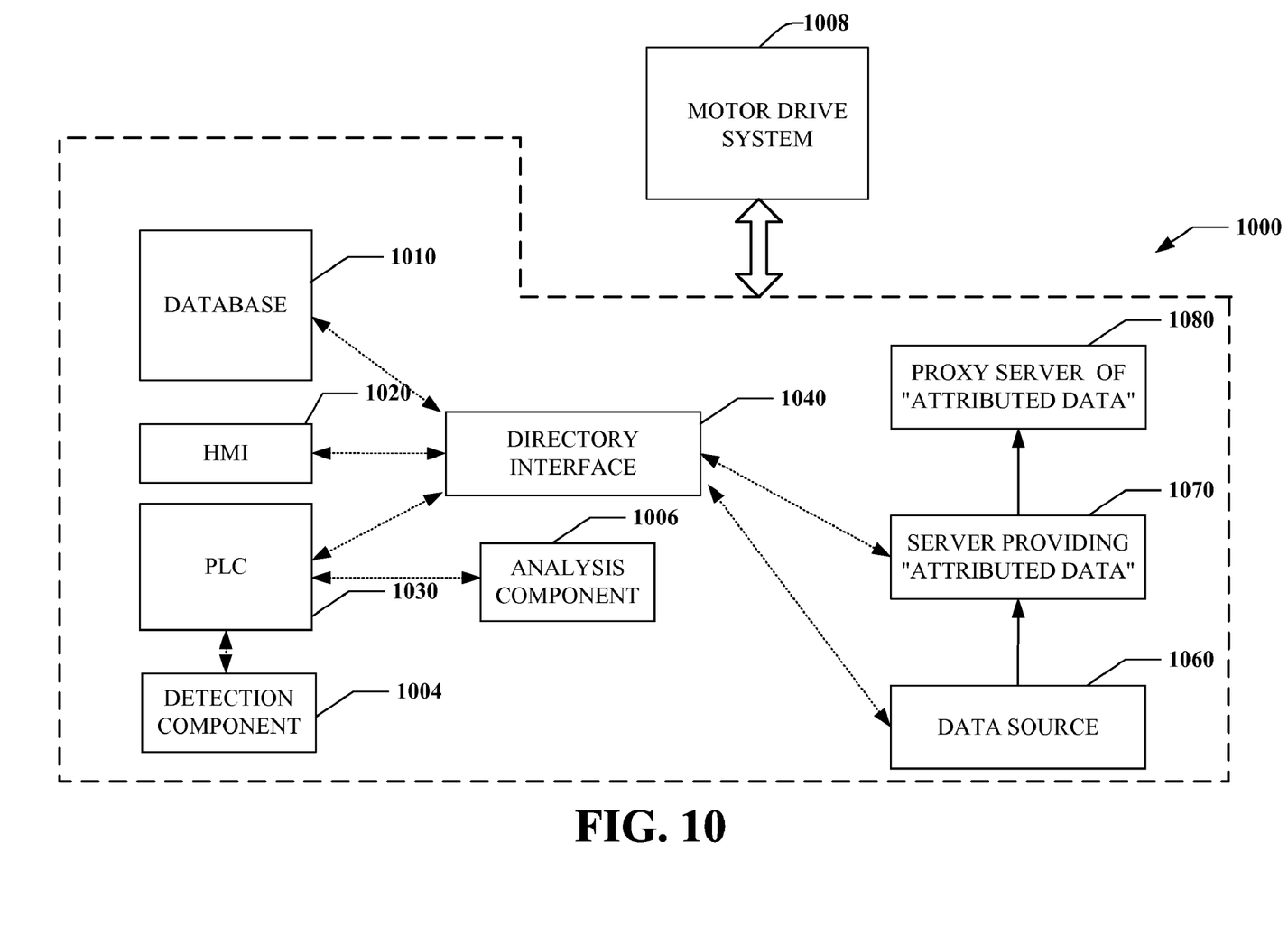
FIG. 10 illustrates a particular industrial environment in accordance with an aspect of the subject innovation.

FIG. 10 illustrates an exemplary industrial automation network that predicts a loss of AC input phase in accordance to an aspect of the subject innovation. The industrial setting 1000 can include a detection component 1004, an analysis component 1006, a motor drive system 1008, database 1010, a human machine interface (HMI) 1020 and a programmable logic controller (PLC) 1030, and a directory interface 1040. A framework is provided such that detection component 1004 measures voltage characteristics of a power source (e.g. a three-phase AC input, a DC voltage on a DC bus, a ripple voltage on a DC bus, or combinations thereof) in conjunction with PLC 1030 supplying predetermined operation requirements to motor drive system 1008 (e.g. motor drive velocity and the like). Analysis component 1006 can filter (e.g. via band-pass filter(s), (FFT) filters, and the like) and compare such voltage to predetermined voltage characteristics associated with a phase loss as described supra. In one aspect, PLC 1030 can convert voltage characteristics to digital signal form; such conversion can enable voltage characteristics to be analyzed wholly via software and/or firmware components, for example. Consequently, voltage characteristics measured can be further applied to prediction of AC input phase loss for the industrial network without design, implementation and expense of additional hardware.

The detection component 1008 can additionally associate with a directory interface 1040 that can be employed to provide data from an appropriate location such as the data source 1060, a server 1070 and/or a proxy server 1080. Accordingly, the directory interface 1040 can point to a source of data (e.g., database 1010, HMI 1020, PLC 1030, and the like) based upon role and requirements (needs) of a requester (e.g. updated band-pass threshold values characteristic of phase loss on a DC bus). The database 1010 can be one or more of various types such as a relational, network, flat-file or hierarchical systems. Typically, such databases can be employed in connection with various enterprise resource planning (ERP) applications that can service one or more of various business related processes within a company. For example, ERP applications can be related to human resources, budgeting, forecasting, purchasing and the like. In this regard, particular ERP applications may require data that has certain desired attributes associated therewith. Thus, in accordance with an aspect of the subject invention, the directory interface 1040 can provide data to the database 1010 from the server 1070, which provides data with the attributes desired by the database 1010.

Moreover, the HMI 1020 can employ the directory interface 1040 to point to data located within the industrial setting 1000. The HMI 1020 can further be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 1020 can request data to have particular visualization attributes associated with data in order to easily display such data thereto. For example, the HMI 1020 can query the directory interface 1040 for a particular data point that has associated visualization attributes. The directory interface 1040 can determine the proxy server 1080 contains the attributed data point with the desired visualization attributes. For instance, the attributed data point can have a particular graphic that is either referenced or sent along with the data such that this graphic appears within the HMI environment instead of or along with the data value.

As explained earlier, the PLC 1030 can be one or more models such as Allen Bradley PLC5, SLC-500, MicoLogix, and the like. The PLC 1030 is generally defined as a specialized device employed to provide high-speed, low-level control of a process and/or system. The PLC 1030 can be programmed using ladder logic or some form of structured language. Typically, the PLC 1030 can utilize data directly from a data source (e.g., data source 1060) that can be a sensor, encoder, measurement sensor, switch, valve and the like. The data source 1060 can provide data to a register in a PLC and such data can be stored in the PLC if desired. Additionally, data can be updated (e.g., based on a clock cycle) and/or output to other devices for further processing.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that detects phase loss comprising:
   a three-phase rectifier component that converts three-phase AC power to DC power;
   a DC bus that provides DC power to one or more three-phase load devices;
   a detection component that measures a magnitude and a frequency of a three-phase AC voltage and measures a magnitude and frequency of a ripple voltage associated with a converted three-phase DC voltage;
   a converter component that converts an analog ripple voltage signal to a digital ripple voltage signal;
   a digital filter component that applies a Fast Fourier transform filter to the digital ripple voltage signal to isolate voltage components caused by single-phase operation from voltage components caused by standard operation of a three-phase load device;
   a firmware controller component that compares the magnitude and the frequency of the AC voltage to predetermined voltage characteristics indicative of a phase loss and compares the magnitude and frequency of the DC ripple voltage to predetermined voltage characteristics indicative of a phase loss and compares and compares the filtered digital ripple voltage signal to predetermined voltage characteristics indicative of a phase loss.

2. The system of claim 1, the detection component further comprises a magnitude component that measures the magnitude of the three-phase voltage.

3. The system of claim 1, the detection component further comprises a frequency component that measures the frequency of the three-phase voltage.

4. The system of claim 1, the detection component is comprised of hardware, software, and/or firmware components.

5. The system of claim 1, the ripple voltage frequency associated with phase loss is substantially equal to 120 Hz.

6. A method to detect a phase loss condition in a three-phase power supply comprising:
   converting AC power to DC power;
   providing DC power to one or more three-phase load devices;
   measuring a magnitude and frequency of a three-phase voltage of an AC power source, a DC power source and DC ripple voltage;
   converting an analog ripple voltage signal to a digital ripple voltage signal;
   applying a Fast Fourier Transform filter to the digital ripple voltage signal; and
   comparing the measured magnitude and frequency to a magnitude and frequency associated with phase loss for the measured AC voltage, DC voltage and the filtered digital DC ripple voltage, the comparison performed wholly by firmware.

7. The method of claim 6, comprising initiating a shut down procedure for a device deriving power from the power source.

8. The method of claim 6, the measuring is performed by hardware, software, or firmware components, or combinations thereof.

9. The method of claim 6, comprising indicating a phase loss condition has occurred.

10. A method to detect a phase loss condition in a three-phase electrical system comprising:
    monitoring a magnitude and frequency of a ripple voltage associated with a DC bus;
    converting an analog ripple voltage signal to a digital ripple voltage signal;
    applying a Fast Fourier Transform filter to the digital ripple voltage signal; and
    comparing the monitored magnitude and frequency to a magnitude and frequency associated with phase loss for the measured DC voltage and the filtered digital DC ripple voltage, the comparison performed wholly by firmware.

11. The method of claim 10, further comprising taking a load device offline if the filtered ripple voltage is greater than a predetermined threshold for longer than a threshold period of time.

12. The method of claim 10, further comprising posting a fault that indicates a phase loss has occurred if the monitored magnitude and frequency is substantially equal to a magnitude and frequency associated with phase loss.

13. The method of claim 11, the load device is a three-phase motor drive.

14. The method of claim 10, the Fast Fourier Transform filter is combined with a band-pass filter.

15. A system that detects phase loss in an industrial network comprising:
    supplying means for supplying predetermined operation requirements to a motor drive system;
    means for measuring ripple voltage characteristics of a DC voltage bus in conjunction with the supplying means;
    means for converting the analog ripple voltage to a digital ripple voltage;
    means for applying a fast Fourier Transform filter to the digital ripple voltage; and
    firmware comparing means that compares the voltage characteristics of the filtered DC ripple voltage to predetermined voltage characteristics associated with a phase loss.

16. The system of claim 15, further comprising a means for pointing to a source of data based upon requirements of a requester.

17. The system of claim 15, further comprising a means for display that displays processes of the industrial network.

* * * * *